Jan. 23, 1945.   R. GALLAY   2,367,719
DENTAL HAND PIECE
Filed Oct. 27, 1942
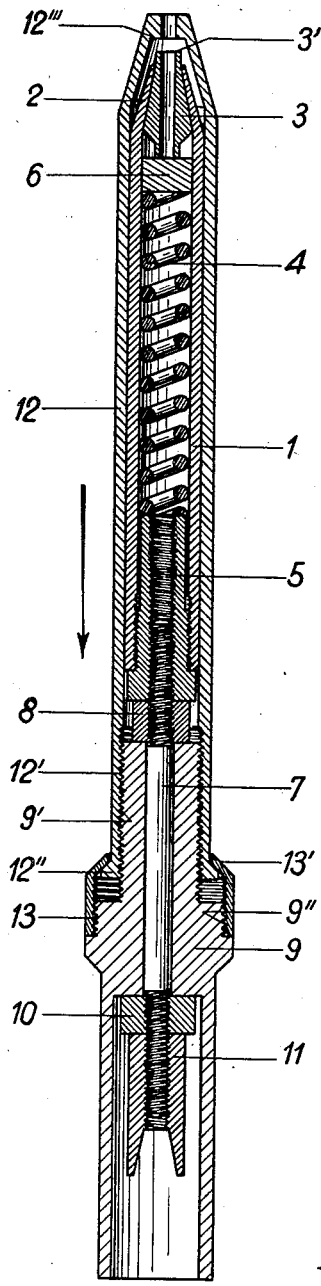
Inventor
R. Gallay Patented Jan. 23, 1945

2,367,719

UNITED STATES PATENT OFFICE 2,367,719

DENTAL HAND PIECE

Robert Gallay, Geneva, Switzerland

Application October 27, 1942, Serial No. 463,525
In Switzerland April 4, 1942

5 Claims. (Cl. 279—52)

The present invention relates to dental hand pieces of the kind which comprises a concentric and automatic clamping device for the cutter.

It is an object of the invention to provide a hand piece which will permit of clamping short-shanked as well as long-shanked cutters.

The invention mainly consists in providing the hand piece of the kind under consideration with a hollow shaft, the axial bore of which terminates as a cone at its outer end and in disposing within said tapered portion of the bore a tapered split chuck and within the inner portion of this bore a spring bearing against the inner end of the hollow shaft. This spring tends to urge the chuck forward or outwardly and to press the jaws of the chuck against each other due to the co-operation thereof with the cone of the bore.

Other and further objects and advantages of the invention will be hereinafter set forth and the novel features thereof defined by the appended claims.

In the drawing there is represented as an example a preferred embodiment of the invention in axial sectional view.

The hand piece shown comprises a hollow driven shaft 1, the axial bore of which terminates, at its outer end, in a cone 2. Within this tapered portion 2 of the bore there is lodged a tapered split tool-supporting chuck 3, three or more jaws of which tend to spread from each other due to their elasticity. The hollow shaft 1 includes also in the rear portion of its bore, an helicoidal spring 4 bearing against the outer end of a tubular stop piece 5 and which, by means of a sliding piece 6, tends to urge forward the chuck 3. The hollow shaft 1 is made dependent upon a secondary driven shaft 7 threaded at its respective ends by means of the tubular stop piece 5 which is screwed on the one hand into the hollow shaft 1 and, on the other hand, on the secondary shaft 7, and locked in screwed position by a lock nut 8. The secondary shaft 7 rotates freely in the axial bore of a so-called "slip-joint" bearing 9 and is secured against any axial movement relative to this "slip-joint" on the one hand by the lock nut 8, and on the other hand by a second lock nut 10 which further serves to lock, against any axial displacement, the coupling member 11 which is screwed on the inner end of the secondary shaft 7.

An external sleeve 12, the inner end 12' of which is screwed on an externally threaded outer extension 9' of the slip-joint 9, encircles and guides the hollow shaft 1 like a bearing. A locking ring 13, screwed on the externally threaded central body 9'' of the slip-joint 9, surrounds with its inwardly projecting lip 13' an external flange 12'' of the inner end of sleeve 12. This locking ring 13 permits sleeve 12 to be screwed or unscrewed only for a predetermined number of revolutions on the slip-joint 9 without entirely separating said pieces from each other.

In the operation of the hand piece, when the external sleeve 12 is unscrewed, in the position shown in the drawing, until its external flange 12'' bears against lip 13' of locking ring 13, then the internal surface 12''' of the head of sleeve 12 is substantially spaced from the outer end 3' of chuck 3. Under the action of spring 4, the chuck 3 may thus be urged forward and its jaws, coacting with the end cone 2 of the hollow shaft 1, tend to be pressed against each other thus clamping the shank of the cutter (not shown).

By screwing sleeve 12 on slip-joint 9, the sleeve will be moved axially in the direction of the arrow relative to the hollow shaft 1, which latter remains axially immovable, and surface 12''' will bear against the front end 3' of the chuck 3 thus moving the latter inwardly, against the action of the spring 4, into the interior of the hollow shaft 1. The jaws of the chuck are thus permitted to move away from each other for facilitating the introduction of the shank (not shown) of a cutter therebetween. The clamping of the shank of this cutter will be effected by unscrewing sleeve 12 relative to slip-joint 9 until this movement is stopped by the locking-ring 13. The sleeve 12 will be thus moved axially with respect to the hollow shaft 1 in opposite direction to the arrow; surface 12''' will move away from the outer end 3' of the chuck permitting the jaws of this chuck to clamp the shank of the cutter due to the co-operation of the cone 2 under the action of the spring 4.

The locking ring 13 is so registered that, in operative position of the hand piece, the surface 12''' of the external sleeve will be substantially detached from the outer end 3' of the closed chuck and any friction between said surfaces will be avoided during the rotation of the hollow shaft.

In order to disengage the cutter and introduce a new tool in the chuck, it is sufficient to screw-in fully sleeve 12 on the slip-joint 9 as indicated above.

I claim:

1. Dental hand piece comprising a hollow driven shaft, the axial bore of which has its outer end formed as a cone, a tapered split tool-supporting chuck slidably adjusted in said outer end of said axial bore and normally projecting slightly beyond the outer end of the bore, a spring lodged in the inner portion of said bore and adapted to urge said chuck against said cone, an external sleeve adjusted on said hollow shaft and adapted to axially slide relative to said shaft and having an internal surface at its outer end adapted to engage the projecting end of the chuck and move said chuck inwardly against the action of said spring in the interior of said hollow shaft when said sleeve is moved axially inwardly relative to said shaft.

2. Dental hand piece comprising a secondary driven shaft and a hollow driven shaft in fixed connection to each other, a bearing for said secondary shaft, said bearing having a threaded outer extension, means securing said hollow driven shaft against any axial displacement relative to said bearing, said hollow shaft having the outer end of its bore formed as a cone, a tapered split tool-supporting chuck slidably adjusted within and normally projecting slightly beyond the outer end of said bore, a spring lodged within the inner portion of said bore and adapted to urge said chuck against said cone, an external sleeve adjusted on said hollow shaft and adapted to axially slide relative to said shaft, said external sleeve having its inner portion in threaded engagement with the outer extension of said bearing and an internal shoulder on the outer end of the external sleeve adapted to engage the projecting end of said chuck and move said chuck against the action of said spring in the interior of said hollow shaft when said sleeve is moved axially inwardly relative to said shaft by screwing it on said extension of said bearing.

3. A dental hand piece as claimed in claim 2, wherein the bearing of the secondary shaft has a threaded central body and a locking ring is screwed on said central body, said locking ring being adapted to co-operate with the external sleeve for limiting the axial movements of the latter relative to the bearing and to the hollow shaft.

4. A dental hand piece comprising a bearing constituting the main part of a handle having a threaded outer extension, a driven shaft journalled in said bearing, a hollow sleeve-like shaft adjustably connected with the driven shaft and having the outer end of its bore formed as a cone, a tapered split tool supporting chuck slidably adjusted within and having a portion normally projecting slightly beyond the outer end of the bore, a spring lodged within the inner portion of said bore of the hollow sleeve like shaft and adapted to urge said chuck against said cone, an external sleeve telescoped about said sleeve-like shaft and having its inner portion in threaded engagement with the threaded outer extension of said bearing, an internal shoulder on the outer end of said external sleeve adapted to engage the projecting end of said chuck and to move said chuck against the action of said spring into the interior of said sleeve-like shaft when the external sleeve is moved axially inwardly by screwing it on the extension of said bearing, and a further sleeve adjustably engaged with said bearing and arranged about the external sleeve for limiting the outward movement of the latter.

5. A dental hand piece as claimed in claim 4 wherein the driven shaft has the inner end threaded and an interiorly and exteriorly threaded sleeve engaged about the threaded portion of the driven shaft and interiorly of the sleeve-like shaft and constituting a means for adjustably connecting the sleeve-like shaft to the driven shaft.

ROBERT GALLAY.